Feb. 17, 1970     E. G. RIGGS     3,495,331

THREADED-ROD CUTTER

Filed Sept. 20, 1967

*INVENTOR.*
EDWIN GRAHAM RIGGS

BY

AGENT

United States Patent Office 3,495,331
Patented Feb. 17, 1970

3,495,331
THREADED-ROD CUTTER
Edwin Graham Riggs, 5103 Randolph Road,
Rockville, Md. 20853
Filed Sept. 20, 1967, Ser. No. 669,087
Int. Cl. B26b *13/00*
U.S. Cl. 30—233
4 Claims

ABSTRACT OF THE DISCLOSURE

This invention relates to threaded-rod cutter apparatus wherein the opposing jaw members are modified such that the lower jaw member includes specially constructed supporting means to accommodate the threaded-rod, and the upper jaw member includes the cutting means which severs the rod in a manner such that the threaded portions of the rod adjacent the location of the cut are not distorted or otherwise damaged.

---

Continuous threaded-rod finds many and diversified applications in modern industry. One of such applications is in the plumbing industry where such continuous threaded-rod is used by plumbers to suspend hangers from the ceilings or walls of buildings to support pipe. In such applications it is necessary that the rod be cut to desired lengths at the site where the pipe is being suspended. The end portions of the cut rod are then engaged in threaded holding and clamping means. One end is threadably engaged with a cooperating threaded member in a support means anchored or securely fastened to the ceiling or wall of the building. The other end is threadably engaged with a suitable clamping means for supporting a pipe in suspended relation to the aforesaid ceiling or wall.

Such an application or use of cut threaded-rod commonly requires a great number of diversified lengths to be cut from a standard length of threaded-rod. It is important that the threads along the length of the rod remain undamaged such that the end portions of the cut rods may be easily threaded into their respective holding or clamping means. Tradesmen using such threaded-rod have experienced considerable difficulty in attempting to sever the rod without damaging the threads to such an extent that it becomes impossible or extremely difficult to engage the threaded portions into a cooperating threaded connector or clamp. For example, cutting of the rod with hack-saw or bolt cutter damages the threads in the proximity of the cut beyond further use. The avoidance of damage to the threaded-rod has resulted in much lost time and inconvenience to the trade, since extreme care is necessary with presently available cutter apparatus.

The cutter apparatus commonly employed for such operations is a hand operated shear cutter including opposed cutting jaws that are movable to and from each other with a suitable displacement of lever arms. Usually both jaws are equipped with single-edge cutting blades. The use of such a cutter apparatus for threaded rod results in damage to the thread members closely adjacent the location of the cut as mentioned previously. It is not unusual that the threads undergo appreciable deformation as a result of the forces induced in the rod from the pressure exerted by the opposed cutting members as they slice through the rod. The deformation often renders the end portions of the rod unusable because the deformed threads will not properly engage with the cooperating threaded portions of a clamp as required for their further use in the application mentioned above.

An object of the present invention is to provide a cutter apparatus to sever threaded-rod such that the threads are not deformed and remain sufficiently uniform to engage a threaded cooperating member.

Another object is to provide improved cutting members including specially constructed gripping means for clamping the threaded-rod to prevent the rod from being deformed as it is cut and to thereby preserve the threaded portions of the rod adjacent the position of the cut.

Yet another object of the invention is to provide cutter apparatus for severing threaded-rod that is readily adaptable to cut various sized diameter rod.

Still another object is to provide improved cutting members for cutter apparatus including means for enabling the cut portions of the rod to separate from the area of the cutting member.

In accordance with one embodiment of the invention, the lower jaw member of a pair of opposing movable jaw members is modified to comprise a pair of spaced supporting means, each having aligned portions for supporting the threaded-rod in a manner such that the threads remain undistorted at the conclusion of the cutting operation. The opposed upper jaw is mounted to move between the pair of spaced members to sever the threaded rod at one or two points between the holding portions of the spaced lower members.

In another embodiment of the invention, the spaced lower jaw members each comprise a series or plurality of aligned supporting means in which each aligned pair of supporting means is of a different size than the other aligned pairs to accommodate a number of different diameter threaded-rod.

In another embodiment of the invention, means are provided in each of the spaced lower jaw members to enable the cut portion of the rod to fall easily from the cutter to prevent the cutter from being jammed.

This invention has many advantages other than those set forth above and will now be described in detail for the purpose of illustrating the general principles of its operation. However, it is to be understood that such detailed description is not to be taken in a limiting sense, since the scope of the invention is set forth in the appended claims.

DETAILED DESCRIPTION

Figure 1:
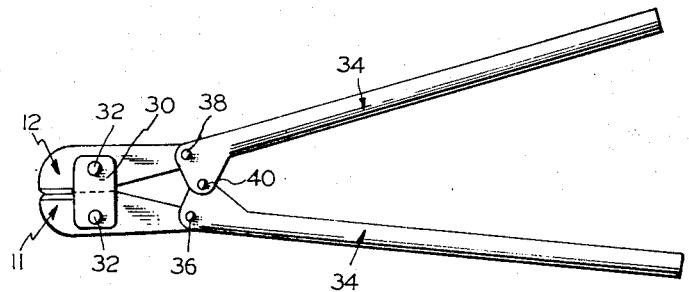
FIGURE 1 is a side elevation view of a cutter apparatus which is suitable for incorporating the features of the invention.

FIGURE 1 shows a cutter apparatus of the shear type including opposed cutting members 11, 12 which are rotatably mounted to a connecting member 30 by pins 32. Cutting members 11, 12 are each pivotably mounted at one end to lever arms 34 by pins 36, 38 respectively. The lever arms 34 are pivotally engaged at pin 40 to enable cutting members 11, 12 to move to and from one another by suitable manipulation of lever arms 34. The operation of such common shear type cutter apparatus are sufficiently well known to those skilled in the art that further detailed description is unnecessary for the purposes of this invention. Such shear type apparatus are merely illustrated to provide an apparatus in which the embodiments of the invention may be incorporated to provide an improved cutter apparatus for the purposes set for herein. Those familiar with the art will readily recognize that the various embodiments of the invention may be incorporated in other, different type cutter apparatus. For example, the cutter may be a power driven press or power actuated shear type cutter.

Figure 2:
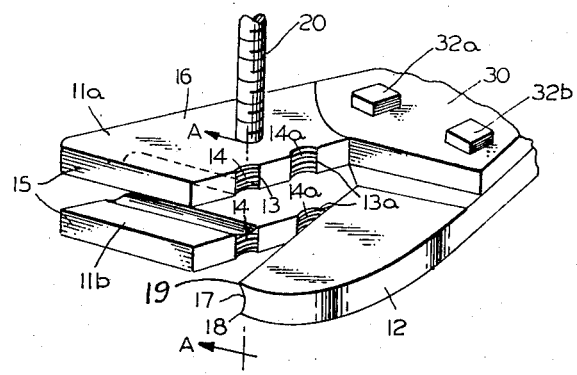
FIGURE 2 is a perspective view of the end portions of the lower and upper jaw members illustrating an embodiment of the invention.

FIGURE 2 shows a preferred embodiment of the upper and lower jaw members. Lower jaw member 11 comprises two, parallel spaced jaw pieces 11a, 11b pivotally mounted to connecting member 30 by pivot 32a which extends through jaw pieces 11a, 11b. Lower jaw member 11 may also comprise a single jaw piece with a suitable space provided to accommodate the movement of the upper jaw member. Pivot 32a is preferably a nonpermanent fastening means to provide for the easy removal of lower jaw pieces 11a, 11b for reasons which will be more clearly explained later. Pivot 32a may, therefore, be a bolt having a fixed nut at one end and a removable nut at the other end. Jaw pieces 11a, 11b are constructed from metal stock and may be approximately ¼" to ⅜" thick. Gripping support means 13, 13a are provided a spaced distance apart on each of jaw pieces 11a, 11b such that they are aligned with their respective counterpart on each jaw piece. The spacing between lower jaw pieces 11a, 11b is approximately ⅜" to ½" for the double-edged cutting means shown in FIGURE 2. For a single-edged cutting means the spacing is reduced as will be discussed below.

Gripping support means 13, 13a are preferably semi-circularly shaped and of different radii to support different diameter threaded rod. Support means 13, 13a each include threads 14, 14a respectively, whose longitudinal axis is perpendicular to the side surfaces 16 of jaw pieces 11a, 11b to accommodate the threads of threaded rod 20 when it is inserted into the gripping support means. Threads 14, 14a correspond exactly to the thread size of the diameter threaded-rod that each is to accommodate. It is, of course, recognized that jaw pieces 11a, 11b, may each have a plurality of aligned gripping support means of various diameters to hold more than two different diameter threaded-rod as illustrated in FIGURE 2. Furthermore, since pivot 32a is preferably removable, jaw pieces 11a, 11b may be replaced with other jaw pieces having a plurality of yet different radii gripping support means 13, 13a. This enables the tradesmen to have a versatile tool which can accommodate virutally all sizes of threaded-rod.

Figure 2A:
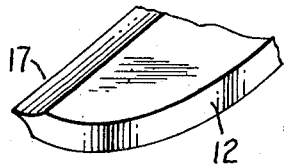
FIGURE 2a illustrates a modification of the upper jaw member to include only a single edge.

Continuing with FIGURE 2, upper jaw member 12 is constructed from stock material having a thickness which enables it to move freely between spaced jaw pieces 11a, 11b. Upper jaw member 12 is pivotally mounted to connecting member 30 by pivot 32b which, like pivot 32a, is also removable to allow the easy replacement of jaw member 12. Jaw member 12 comprises semi-circular cutting means 17 which preferably includes two cutting edges 18, 19. The shape of cutting means 17 is unimportant and it will be recognized that other than semi-circularly shaped cutting means can be provided. Cutting means 17 may be in the shape of an inverted V, for example. Cutting means 17 need not comprise double cutting edges, but may be a single knife-edge, although best results are achieved with a double-edged cutter as shown in FIGURE 2. However, if cutting means 17 is single-edged as shown in FIGURE 2a, then the spacing between lower jaw pieces 11a, 11b must be reduced to approximately ⅛" to 3/16" such that the position of the cut is as close as possible to the opposed surfaces of jaw pieces 11a, 11b. If the spacing between the knife edge and the respective opposed surface of jaw piece 11a or 11b, or both, is too large, the threaded-rod will tend to be distorted and the threads possibly rendered unsuitable for their intended purpose.

In operation, a threaded-rod 20 is inserted in gripping support means, such as 13, which corresponds to its diameter, and cutting means 17 is caused to cut through threaded-rod 20 as upper jaw member 12 and lower jaw pieces 11a, 11b moves toward one another. Because threaded means 14 exactly accommodate the threaded members of threaded-rod 20 and, since gripping support means 13 provide a relatively wide base support, there is little or no distortion of the threads of threaded-rod 20 by the force exerted by cutting means 17 as the rod is severed. It is readily apparent that rod 20 is severed in two places because cutting means 17 comprises two cutting edges 18, 19. The severed portion of the rod is allowed to fall between jaw pieces 11a, 11b.

For the best results, i.e., the least deformation of the threaded-rod, it is important that cutting edges 18, 19 pass as closely as possible to the respective opposing faces of lower jaw pieces 11a, 11b. A wide spacing will enable the rod to bend, thereby distorting the threads.

Figure 3:
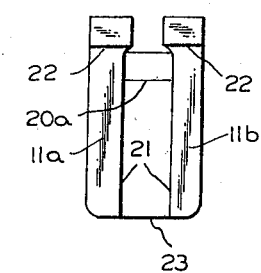
FIGURE 3 is a sectional view, taken through section A—A as shown in FIGURE 1 of the lower spaced jaw members showing means for providing removal of the cut portions of the rod.

FIGURE 3 shows a modification of the lower jaw pieces 11a, 11b to enable a cut portion 20a of the threaded-rod to escape from between the opposing jaw pieces. A channel 21 is provided by removing a portion of material from each face of jaw piece 11a, 11b to form a slot in each face from the bottom edges 22 of gripping support means 13, 13a to the edge 23 of each respective jaw piece.

While there has been shown and described the fundamental novel features of the invention as applied to several preferred embodiments thereof, it will be understood that various modifications and alterations may be made by those skilled in the art, without departing from the spirit of the invention. It is the intention to be limited, therefor, only as indicated by the scope of the appended claims.

The inventor claims:

1. A jaw element for a threaded-rod cutter apparatus of the shear type, comprising:
   a lower jaw member and an opposing upper jaw member being pivotally mounted to move to and from one another,
   said lower jaw member including two jaw sections mounted in parallel spaced relation to one another and each including a plurality of aligned gripping support means for receiving and retaining a threaded-rod,
   said gripping support means being semi-circularly shaped with individual ones of said aligned gripping support means having a different radius from the remaining aligned gripping support means and each gripping support means including threaded means,
   said threaded means of each aligned gripping support means having different sized threads to accommodate different thread sizes and diameters of said threaded-rod, and
   said upper jaw member including cutting means for severing said threaded-rod by moving between said jaw sections whereby the threads of said threaded-rod remain undistorted.

2. A jaw element according to claim 1 wherein said cutting means includes two cutting edges, said cutting edges being spaced to cut the threaded-rod in two places, said cutting edges being constructed to pass closely adjacent a respective surface of said spaced jaw pieces.

3. A jaw element according to claim 1 wherein said cutting means includes a single edge, said cutting edge being constructed to pass closely adjacent the opposing faces of said spaced jaw pieces.

4. A jaw element according to claim 1 wherein said jaw pieces each include slot means formed in opposing faces of said jaw pieces to provide a channel for the passage of the cut portion of the threaded-rod.

References Cited

UNITED STATES PATENTS

| | | | |
|---|---|---|---|
| 13,570 | 9/1855 | Grover | 30—233 X |
| 596,546 | 1/1898 | Runyan | 30—258 |
| 2,007,355 | 7/1935 | Wallace | 30—258 |
| 2,560,318 | 7/1951 | Wenger | 30—240 X |

ROBERT C. RIORDON, Primary Examiner

J. C. PETERS, Assistant Examiner

U.S. Cl. X.R.

30—258